Oct. 21, 1924. Re. 15,933
R. R. CAREY ET AL.
PERCUSSION FUSE
Original Filed Aug. 19, 1918
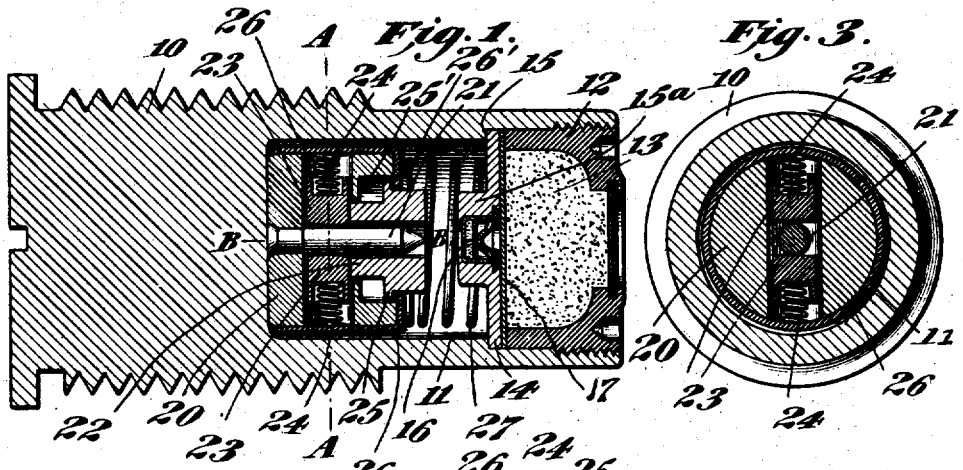
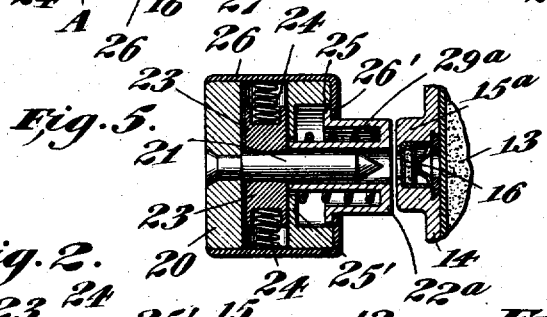
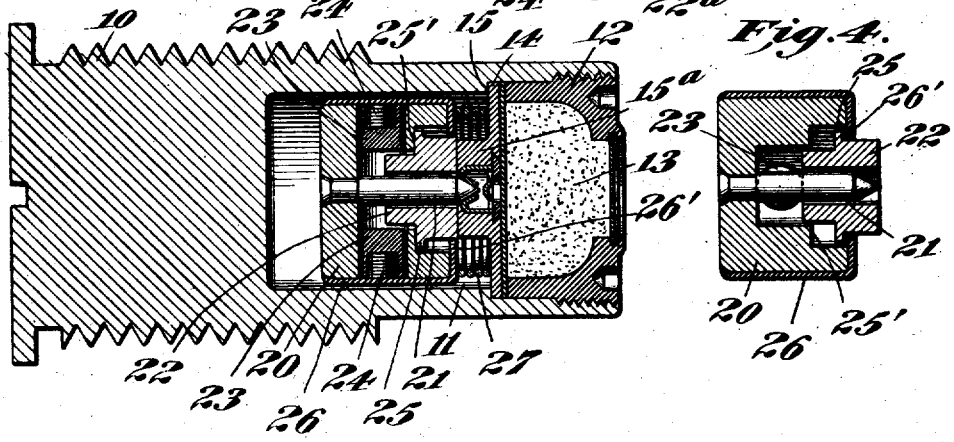
INVENTORS
Robert R. Carey,
William L. Lukens and
Leighton N. D. Mixsell.
BY A. B. Reavis
ATTORNEY Reissued Oct. 21, 1924. Re. 15,933

UNITED STATES PATENT OFFICE.

ROBERT RAYMOND CAREY, WILLIAM L. LUKENS, AND LEIGHTON N. D. MIXSELL, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

PERCUSSION FUSE.

Original No. 1,397,855, dated November 22, 1921, Serial No. 250,566, filed August 19, 1918. Application for reissue filed November 21, 1923. Serial No. 676,161.

*To all whom it may concern:*

Be it known that we, ROBERT RAYMOND CAREY, WILLIAM L. LUKENS, and LEIGHTON N. D. MIXSELL, citizens of the United States, residents, respectively, of Bethlehem, in the county of Northampton and State of Pennsylvania, of Bethlehem, in the county of Northampton and State of Pennsylvania, of Bethlehem, in the county of Northampton and State of Pennsylvania, have made a certain new and useful Invention in Percussion Fuses, of which the following is a specification.

This invention relates to improvements in fuses for explosive projectiles, and more particularly that type of fuse in which the firing pin is normally prevented from striking the primer by locking means which can only be withdrawn by centrifugal action. In the present instance the firing pin point is surrounded by a guard which prevents it from approaching near enough to the primer to contact with the latter, the guard being retained in this position by the centrifugally operated locking means. The invention will be particularly described in connection with the accompanying drawing, in which:—

Figure 1 is a longitudinal view through a base fuse showing the parts in normal or inactive position;

Figure 2 is a similar view showing the relation of the parts after the projectile has been fired and at the moment of impact;

Figure 3 is a section on the line A—A of Figure 1; and

Figure 4 is a section on the line B—B of Figure 1,

Figure 5 is a sectional view of a slightly modified form.

Referring to the drawing, 10 indicates the body of the fuse which is adapted to fit in a central threaded opening in the base of the projectile. The fuse body has a central cylindrical cavity 11 in its forward end and threaded into the forward end of this cavity is a container 12 which holds a charge 13 of explosive composition for igniting the main bursting charge of the projectile. In the rear of the container 12 is a primer seat 14 which is clamped against a shoulder 15 by the container, while suitably located, centrally, in the primer seat is a primer 16, which is separated from the explosive composition by a thin disk of suitable material.

The construction described provides a cylindrical cavity 11 for the firing pin and its associated parts. These parts comprise a cylindrical hammer or plunger body 20 on which is fixed an axially arranged firing pin 21, the point of which extends forward of the body. Surrounding the firing pin at its forward end is a cylindrical guard 22 which is normally located in its forward position with its front end surface flush with or forward of the firing pin point and held in this position by centrifugal bolts 23 which are normally pressed into contact with the firing pin by springs 24. When these bolts are in the position shown in Fig. 1 they prevent rearward movement of the guard 22. The bolts 23 operate in radial openings in the hammer or plunger body and the guard 22 is free to move rearwardly in an axial opening in the hammer or plunger body when the bolts are withdrawn. The guard is provided with an annular flange 25 which limits forward and rearward movement, the flange cooperating with an intermediate shoulder 25′ on the plunger or hammer body and with a flange 26′ on the sheath 26 to be described. A thin metal sheath 26 surrounds the hammer or plunger and forms an abutment for the springs 24. The sheath has a circular opening through which the forward end of the guard normally projects and the margin of which is the inner margin of the flange 26′ engaging the flange 25. The sheath is placed over the hammer or plunger body after the parts are assembled and retained in position by any suitable means, such as by spinning its rear edge over the margin of the base of the hammer or plunger, as shown.

The hammer or plunger is normally held at the rear of the cavity 11 by a spring 27. If it should accidentally move forward before the projectile is fired the guard will come in contact with the primer seat and prevent contact of the firing pin with the primer. When the projectile is fired the locking bolts 23 move radially outward and assume the position shown in Fig. 2 during the flight of the projectile. When the projectile is suddenly retarded, as by a striking an object, the hammer or plunger moves forward to the position shown in Figure 2. The guard being free to move rearward, it permits the firing pin point to strike and fire the primer, which ruptures the diaphragm 17 and ignites the explosive composition 13 which, in turn, ignites the bursting charge of the projectile.

The construction described constitutes a very simple, compact and safe fuse which is certain in operation when fired. The primer seat 14 is preferably provided with a heavy boss 15[a] surrounding the primer and sufficiently strong to prevent injury to the primer by any accidental forward movement of the hammer or plunger before firing.

In the form shown in Fig. 5 the guard 22[a] has an annular recess in which is located a spring 29[a] which has the function of the spring 27, Fig. 1. To hold the hammer or plunger body normally at the rear of the cavity, the guard 22[a] is preferably elongated so that, in its normal position, it is nearly or quite in contact with the primer seat. As soon as the bolts 23 have been withdrawn from the rear of the guard, the guard is free to move rearward relatively to the hammer or plunger body, permitting the firing pin to strike the primer. In other respects the construction shown in Fig. 5 is like that shown in Figs. 1 to 4 inclusive.

It will be noted that in all of the modifications of our invention described the tubular guard member 22 in Figs. 1, 2 and 4 and 22[a] in Fig. 5, is of a length less than that of the pin 21 extending within the cavity of the hammer or plunger member, whereby, when the centrifugal members 23 move out radially, the guard member may be moved rearwardly with respect to the pin so that the latter may project forwardly of the guard member to cooperate with the primer in the manner described.

Having thus described our invention what we claim as new and desire to secure by Letters Patent is:

1. In a fuse for projectiles, the combination of a plunger body having a cavity, a pin connected to the plunger and extending through the cavity, a guard for the pin, and means within the cavity and cooperating with the inner end of the guard for normally holding the latter extended beyond the end of the pin and responsive to centrifugal force to permit relative movement between the pin and the guard.

2. In a fuse for projectiles, the combination of a plunger body, a pin connected to the plunger body, a tubular guard member surrounding the pin, means carried by the plunger body for limiting outward movement of the tubular guard member, and means for holding the guard member extended beyond the end of the pin and responsive to centrifugal force to permit relative movement between the pin and the guard member.

3. In a fuse for projectiles, the combination of a plunger body, a pin connected to the plunger body, a tubular guard surrounding the pin, means carried by the plunger body for limiting outward movement of the tubular guard, resilient means interposed between the plunger body and the tubular guard and effective to urge the latter outwardly, and means for holding the tubular guard member extended beyond the end of the pin and responsive to centrifugal force to permit relative movement between the pin and the guard.

4. In a fuse for projectiles, the combination of a plunger body having a cavity and inwardly-projecting stop means, a firing pin secured to the plunger body, extending through the cavity, and beyond the open end of the plunger body, a guard for the pin and fitting in the cavity and normally extending beyond the pin, centrifugally releasable means for holding the guard extended and responsive to centrifugal force to permit relative movement between the guard and the pin, and stop means carried by the guard and adapted to cooperate with the first stop means for limiting outward or extension movement of the guard.

5. In a fuse for projectiles, the combination of a plunger body having a cavity, a pin extending through the cavity, a guard member for the pin, automatically operable centrifugally releasable means for normally holding the guard member extended outwardly beyond the end of the pin, and a sheath surrounding the plunger body and having means thereon for limiting outward movement of the guard member.

6. In a fuse for projectiles, the combination of a plunger body having a cavity therein provided with an intermediate abutment, a pin carried by the plunger body and extending through the cavity and beyond one end of the plunger body, a guard member of less length than the pin, automatically operable centrifugally releasable means for normally holding the guard member extended beyond the outer end of the pin, and a sheath surrounding the plunger body and having a flange which extends inwardly beyond the wall of one end of the cavity, said guard member having abutment means thereon for cooperation with the first-named abutment means and with the sheath flange for limiting movement in either direction of said guard member.

7. In a fuse for projectiles, the combination of a plunger body having a cavity therein provided with an intermediate shoulder, a pin carried by the plunger body and extending through the cavity and beyond one end of the plunger body, a guard for the pin and of less length than the latter, automatically operable centrifugally releasable means for maintaining the guard extended beyond the outer end of the pin, a sheath surrounding the plunger body and having a flange which extends over the cavity wall, a flange on the guard member adapted to cooperate with said shoulder and with the sheath flange to limit movement of the guard member, and resilient means for cooperating with the shoulder and the guard member for maintaining the guard extended beyond the outer end of the pin.

8. In a fuse for projectiles, a hammer comprising a cylindrical body, a centrally arranged firing pin fixed to the body and an annular guard surrounding the forward end of the firing pin and movable in a cavity in the hammer body to protect or expose the point of the pin, in combination with a bolt operating in a radial opening in the hammer body and normally arranged in the rear of the guard to hold it in protecting position, a fixed closure movable with said body for the outer end of said opening, said bolt being movable under the influence of centrifugal force to free the guard and permit it to expose the point of the pin.

9. In a fuse a firing device comprising a cylindrical hammer body having an axially arranged firing pin, and having an axial opening surrounding the firing pin, an annular guard in said opening and surrounding the firing pin, radially acting bolts arranged in radial cavities in rear of the guard cavity, and a casing surrounding and secured to the hammer body and closing the outer ends of the bolt cavities, the forward end of the casing being turned inwardly across the guard cavity and adapted to limit the forward movement of the guard.

10. In a fuse structure the combination with a fuse body having a cylindrical cavity therein, of a primer seat carrying a centrally arranged primer closing the forward end of the cavity, a movable member in said cavity having an outer cylindrical surface loosely fitting the inner surface of said cavity comprising, a hammer body constituting part of said movable member carrying a centrally arranged firing pin and provided with a bore or opening in its forward end surrounding said pin, a movable guard with a central bearing surface loosely surrounding said pin and fitting partly within said bore and longitudinally movable within fixed limits, cooperating means on said guard and member within said bore limiting the forward movement of said guard to a position around and protecting the point of said pin and centrifugally releasable locking means within said movable member for normally holding said guard in its forward protecting position.

11. As an article of manufacture a firing device adapted for use in the cylindrical cavity of a fuse body having an outer cylindrical surface adapted to loosely fit in said cavity and to move longitudinally therein, comprising a cylindrical hammer body having a central opening or bore in one end, a firing pin secured to said body centrally of said bore and projecting at its forward end beyond the forward end of said body, a guard surrounding said pin and freely movable thereon between fixed limits within said bore, and adapted to project therefrom around the point of the pin and automatic centrifugally releasable means around said pin at the inner end of said guard inclosed within said member to hold said guard in its forward position.

12. An article of manufacture of the class described comprising a hammer body having an outer surface cylindrical in form and provided with a centrally arranged cavity extending longitudinally from the forward end toward the rear end and with radial openings at the rear end of said cavity, a firing pin extending centrally from the bottom of said cavity to a point beyond the forward end of said hammer body, a guard surrounding and freely movable on said pin longitudinally in said cavity with its forward end normally at least as far forward as the tip end of said pin, cooperating peripheral abutments on said guard and on said hammer member within said cavity to limit the forward movement of said guard, spring pressed bolts in said radial openings bearing against said pin behind the inner end of said guard and normally holding it in its foremost position.

13. An article of manufacture of the class described comprising a hammer body having an outer surface cylindrical in form and provided with a centrally arranged cavity extending longitudinally from the forward end toward the rear end and with radial openings at the rear end of said cavity, a firing pin extending centrally from the bottom of said cavity to a point beyond the forward end of said hammer body, a guard surrounding and freely movable on said pin longitudinally in said cavity with its forward end normally at least as far forward as the tip end of said pin, spring pressed bolts in said radial openings bearing against said pin behind the inner end of said guard and normally holding it in its forward position, a thin sheet metal cylindrical casing secured on the outer surface of said hammer body closing the outer ends of said radial openings and having its forward end bent inwardly over the end of said hammer body and partly across the cavity therein forming an abutment flange and a peripheral flange on said guard behind said inturned end to cooperate therewith and limit the forward movement of said guard.

14. A self contained hammer body for fuses comprising a smooth outer continuous and imperforate cylindrical surface, a central pin in a central cavity in an end of said body and projecting therefrom, a guard in said cavity normally with its forward end projecting from said hammer body surrounding and protecting the point of said pin but freely movable on said pin to the rear and centrifugally releasable means wholly inclosed in said body for normally holding said guard in its forward protecting position.

In testimony whereof we hereunto affix our signatures this 20th day of November, 1923.

ROBERT RAYMOND CAREY.
WILLIAM L. LUKENS.
LEIGHTON N. D. MIXSELL.